US008874359B2

(12) United States Patent
Douglas et al.

(10) Patent No.: US 8,874,359 B2
(45) Date of Patent: Oct. 28, 2014

(54) COLLISION AVOIDANCE METHOD, SYSTEM AND APPARATUS

(75) Inventors: Antony Louis Piriyakumar Douglas, Bangalore (IN); Deepa Felix, Quilon (IN); Denny Joseph, Bangalore (IN)

(73) Assignee: Siemens Aktiengesellschaft, Munich (DE)

( * ) Notice: Subject to any disclaimer, the term of this patent is extended or adjusted under 35 U.S.C. 154(b) by 573 days.

(21) Appl. No.: 13/264,198

(22) PCT Filed: Feb. 19, 2010

(86) PCT No.: PCT/EP2010/052100
§ 371 (c)(1),
(2), (4) Date: Oct. 27, 2011

(87) PCT Pub. No.: WO2010/118904
PCT Pub. Date: Oct. 21, 2010

(65) Prior Publication Data
US 2012/0035847 A1 Feb. 9, 2012

(30) Foreign Application Priority Data
Apr. 13, 2009 (IN) .............. 618/KOL/2009

(51) Int. Cl.
G06F 17/10 (2006.01)
B61L 23/34 (2006.01)
B60W 30/09 (2012.01)
G01S 13/93 (2006.01)
G08G 1/16 (2006.01)
B60T 7/22 (2006.01)

(52) U.S. Cl.
CPC ............ *B61L 23/34* (2013.01); *B60W 30/09* (2013.01); *G01S 13/931* (2013.01); *G08G 1/16* (2013.01); *B60T 7/22* (2013.01); *G01S 2013/9353* (2013.01)

USPC ............... 701/301; 701/19; 701/302

(58) Field of Classification Search
CPC .......... G01S 13/94; G01S 13/931; G01S 2013/9353; G08G 1/16; B60T 7/22; B60W 30/09
USPC ............. 701/301, 19, 469, 302, 300, 117; 246/182 R, 122 R, 125, 1 R, 3; 342/455, 342/357.34; 446/454
See application file for complete search history.

(56) References Cited

U.S. PATENT DOCUMENTS 3,953,714 A * 4/1976 Gabillard ............... 701/117
4,864,306 A * 9/1989 Wiita ..................... 342/42
(Continued)

FOREIGN PATENT DOCUMENTS

GB 2248512 A 4/1992
RU 2288856 C2 12/2006
(Continued)

*Primary Examiner* — Behrang Badii
(74) *Attorney, Agent, or Firm* — Laurence A. Greenberg; Werner H. Stemer; Ralph E. Locher

(57) ABSTRACT

A technique for avoiding collisions between trains includes equipping a plurality of trains each with a transceiver and broadcasting a signal periodically from the transceiver of each train. The signal contains a unique identification of a respective train and a unique identification of a track the respective train is moving on. The transceiver of each train receives the signal broadcasted by each of the other trains within a given range. The received signals are analyzed to extract the unique identification of each other train and the unique identification of the track each other train is moving on. It is determined if the track of the train receiving the signal and any of each other trains within the given range is the same and providing an indication if the track of the recipient train and any of other train within the range is the same.

11 Claims, 13 Drawing Sheets

(56) References Cited

U.S. PATENT DOCUMENTS

| | | | |
|---|---|---|---|
| 5,574,469 A * | 11/1996 | Hsu | 342/455 |
| 5,757,291 A | 5/1998 | Kull | |
| 6,218,961 B1 | 4/2001 | Gross et al. | |
| 2002/0091483 A1 | 7/2002 | Douet | |
| 2005/0251337 A1* | 11/2005 | Rajaram | 701/301 |
| 2007/0260367 A1* | 11/2007 | Wills et al. | 701/19 |
| 2013/0190952 A1* | 7/2013 | Severson | 701/19 |

FOREIGN PATENT DOCUMENTS

| | | |
|---|---|---|
| TW | 200800774 A | 1/2008 |
| WO | 99/52091 A1 | 10/1999 |
| WO | 00/71402 A1 | 11/2000 |

\* cited by examiner

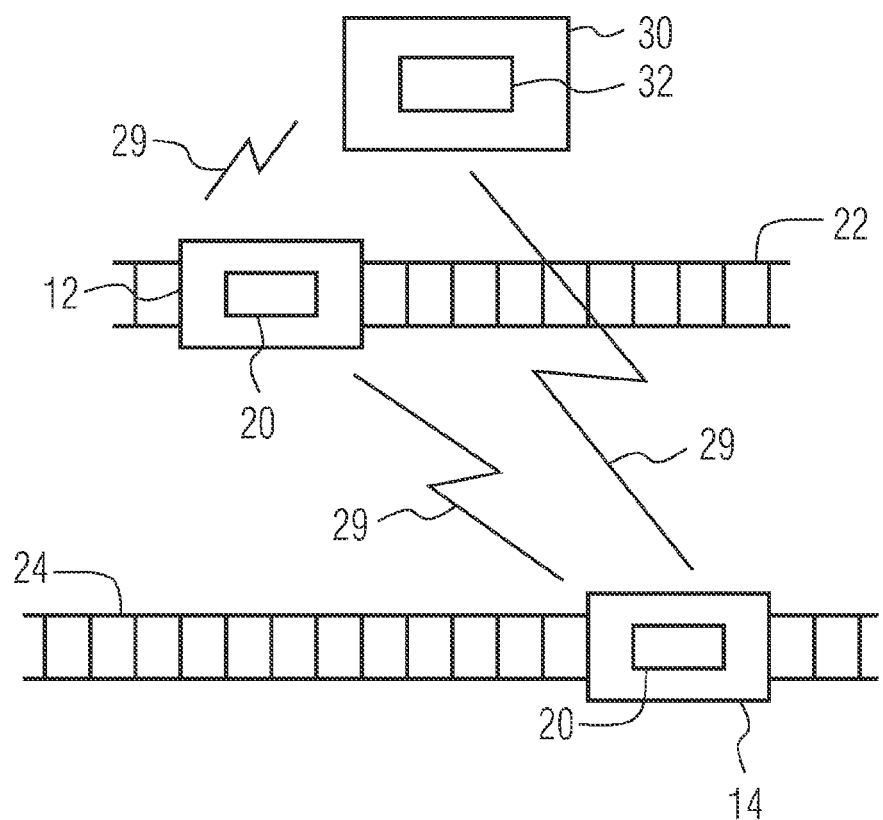
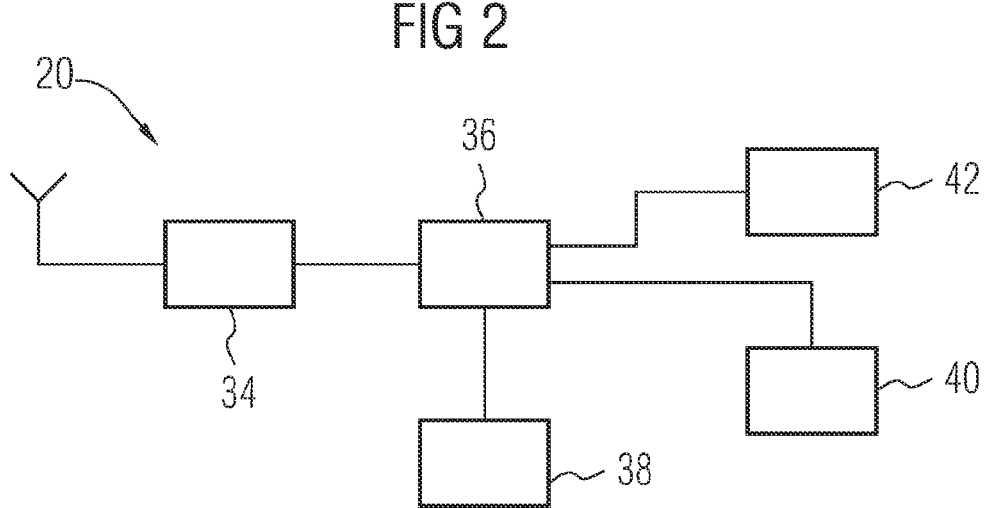

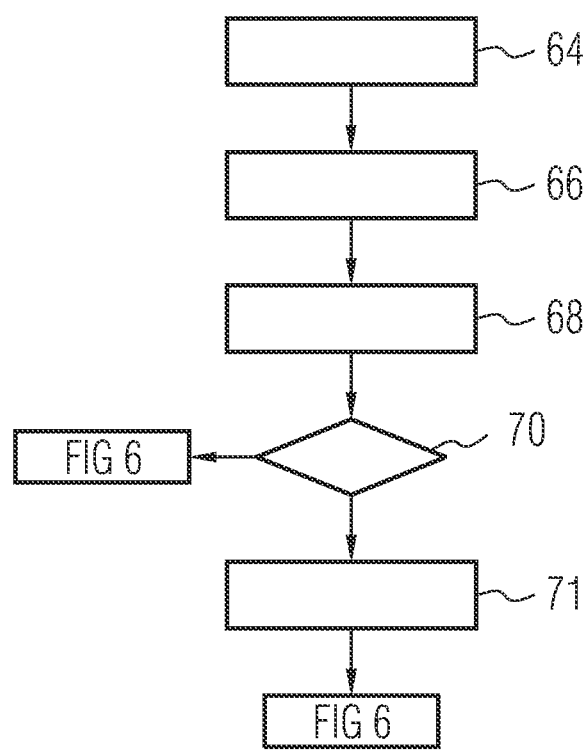

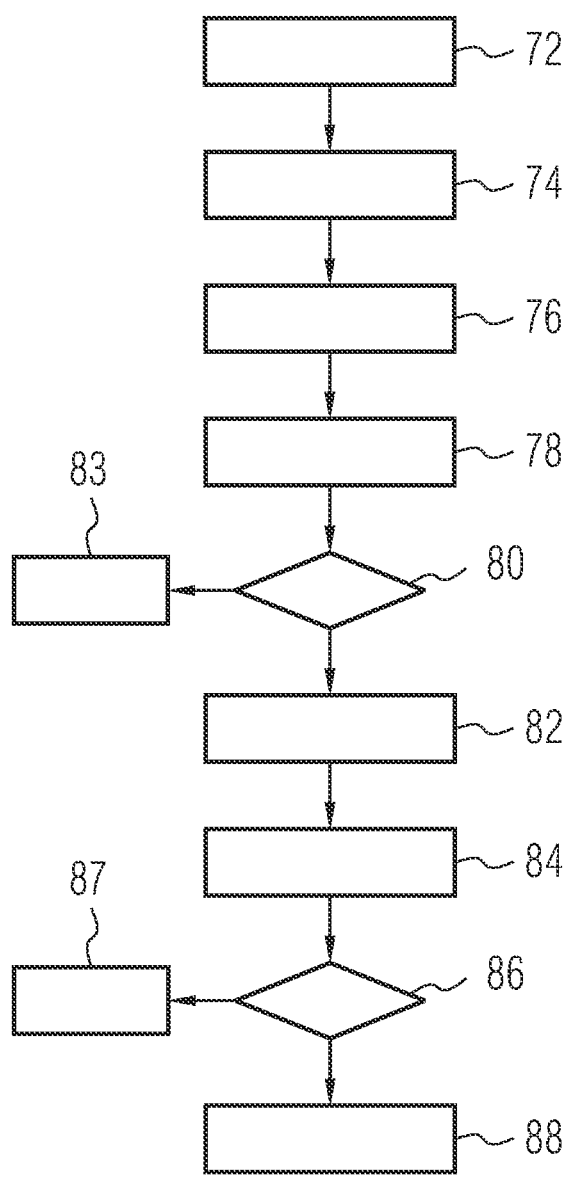

FIG 7b

| LINK ID | DIRECTION $D_0$ TRACK ID | DIRECTION $D_1$ TRACK ID |
|---|---|---|
| 104 | 92 | 90 |
| 106 | 94 | 92 |
| 108 | 96 | 94 |
| 110 | 98 | 96 |
| 112 | 100 | 98 |
| 114 | 98 | 100 |
| 116 | 96 | 98 |
| 118 | 94 | 96 |
| 120 | 92 | 94 |
| 122 | 90 | 90 |
| 124 | 102 | 90 |

FIG 7c

TRAIN 126 - {104, 106} $D_0$

TRAIN 128 - {114, 116, 118} $D_0$

TRAIN 130 - {110} $D_1$

TRAIN 132 - {124} $D_1$

FIG 7d

| TRAIN ID | 104 | 106 | 108 | 110 | 112 | 114 | 116 | 118 | 120 | 122 | 124 |
|---|---|---|---|---|---|---|---|---|---|---|---|
| 126 | ON | . | OFF | * | * | * | . | OFF | OFF | . | . |
| 128 | * | . | OFF | * | OFF | ON | ON | ON | OFF | . | . |
| 130 | . | . | OFF | ON | . | . | OFF | OFF | . | . | . |
| 132 | OFF | . | . | . | . | . | . | . | . | OFF | ON |
| STATUS | CONFLICT | ON | OFF | . | OFF | ON | CONFLICT | CONFLICT | OFF | OFF | ON |

| LINK ID | DIRECTION $D_0$<br>TRACK ID | DIRECTION $D_1$<br>TRACK ID |
|---|---|---|
| 148 | 138 | 136 |
| 150 | 140 | 138 |
| 152 | 142 | 140 |
| 154 | 140 | 138 |
| 156 | 138 | 136 |
| 158 | 136 | 134 |

FIG 8c

TRAIN 144 - {148, 150, 152} $D_0$
TRAIN 146 - {154, 156, 158} $D_1$

FIG 8d

| TRAIN ID | LINK ID | | | | | |
|---|---|---|---|---|---|---|
| | 148 | 150 | 152 | 154 | 156 | 158 |
| 144 | ON | ON | ON | * | * | . |
| 146 | * | * | * | ON | ON | ON |
| STATUS | ON | ON | ON | ON | ON | ON |

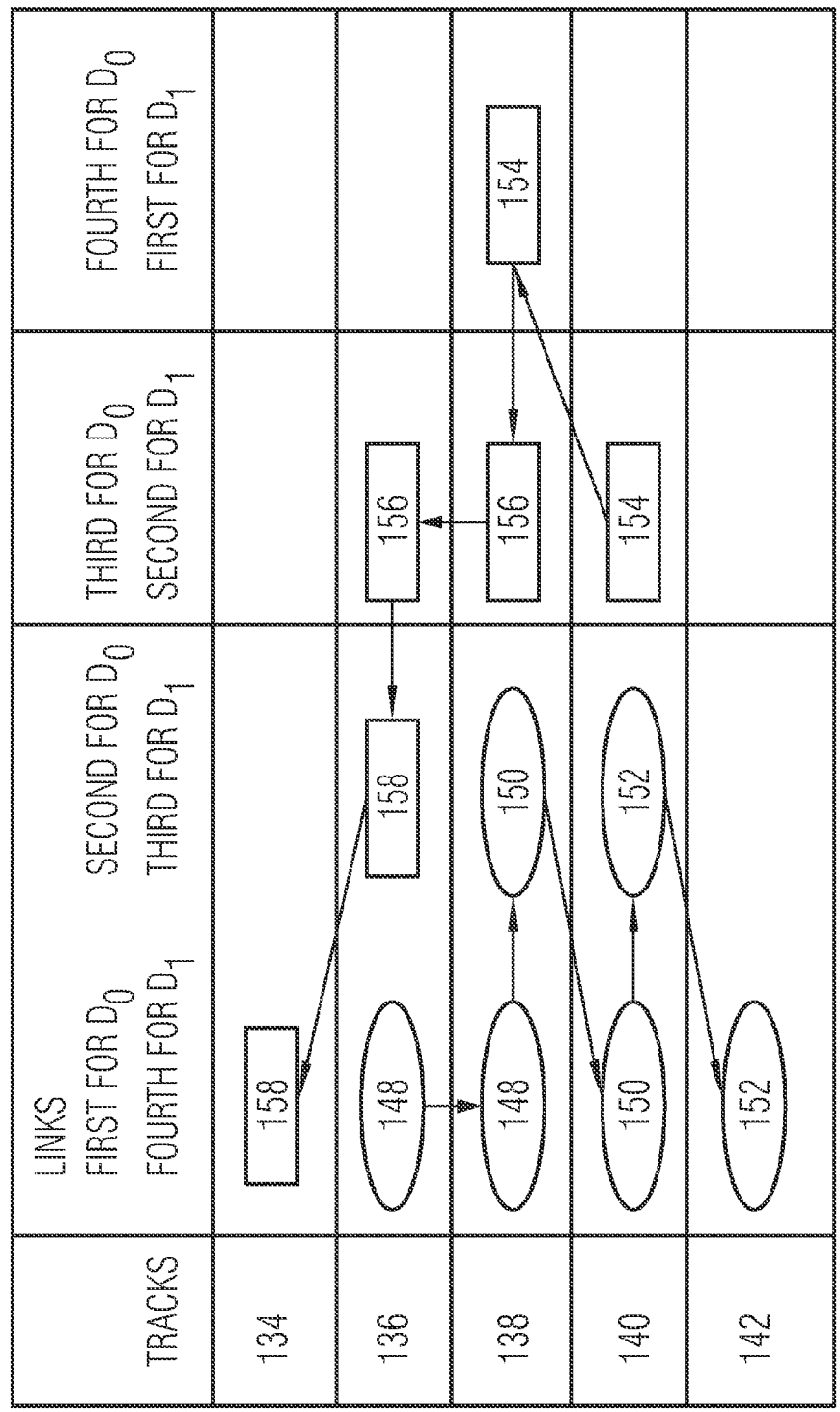

FIG 9a
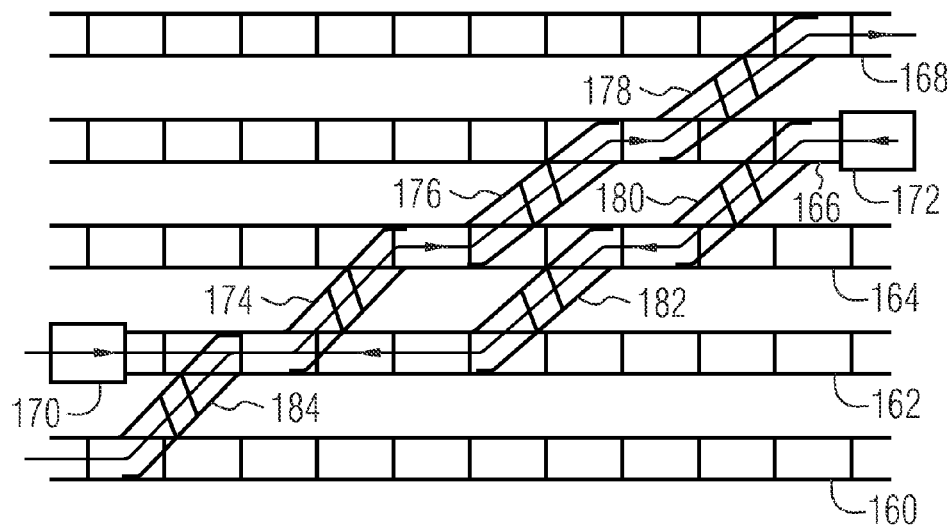
FIG 9b
| TRAIN ID | LINK ID | | | | | |
|---|---|---|---|---|---|---|
| | 174 | 176 | 178 | 180 | 182 | 184 |
| 170 | ON | ON | ON | * | * | OFF |
| 172 | OFF | * | * | ON | ON | ON |
| STATUS | CONFLICT | ON | ON | ON | ON | CONFLICT |
FIG 10
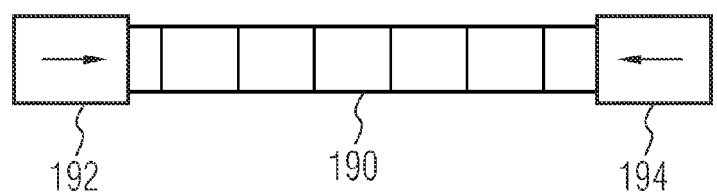

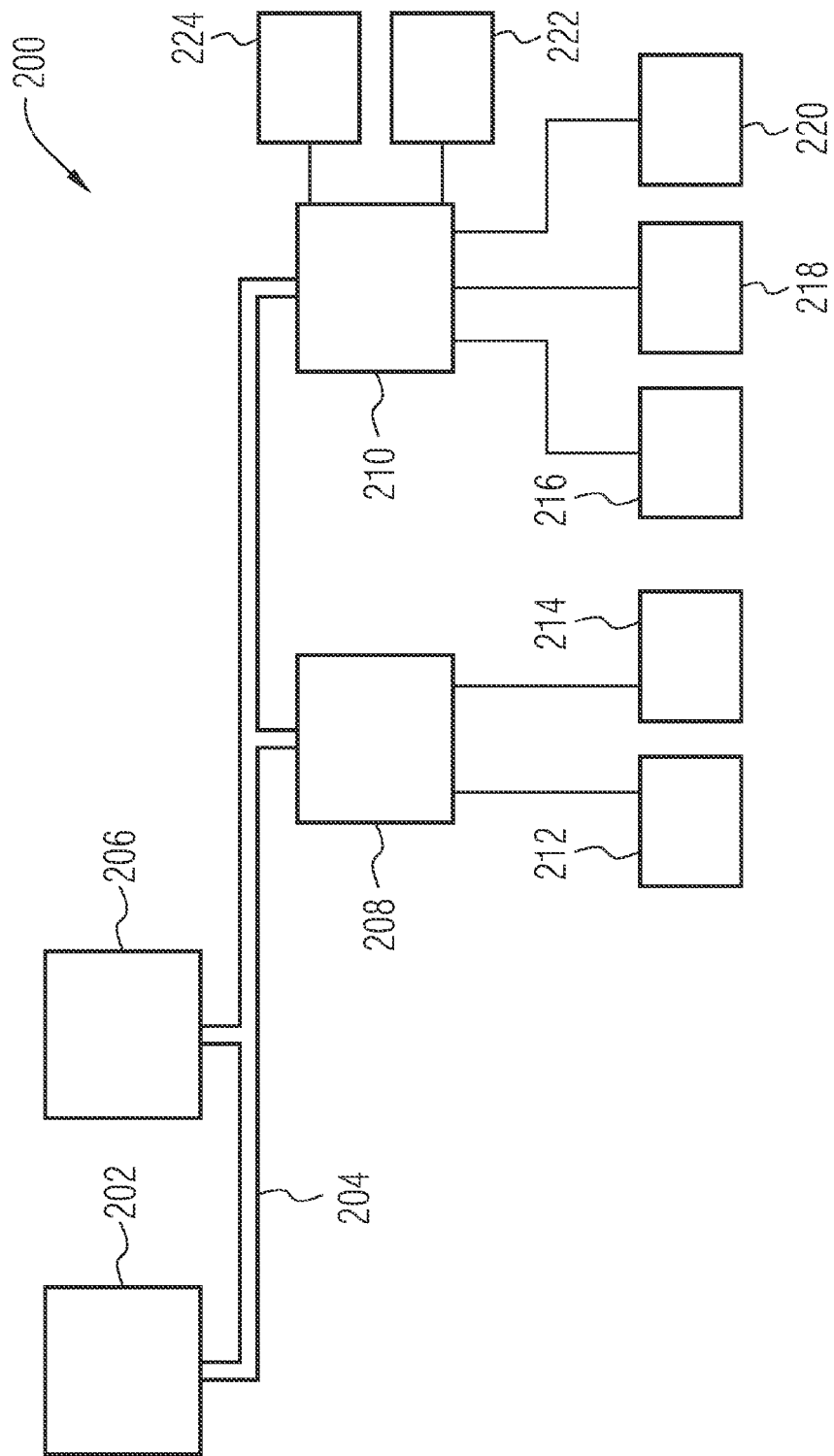

COLLISION AVOIDANCE METHOD, SYSTEM AND APPARATUS

BACKGROUND OF THE INVENTION

Field of the Invention

The present invention relates to a method, system and apparatus for avoiding collision between trains.

Rail transportation in one of the most used means of surface transportation. This means of transportation is economical and can carry huge number of population. One of the major problems in rail transportation is the collision of trains. The collision of trains causes loss of human lives and damage to property. Generally, the types of collisions occurring are head-on collision and rear end collision. Both the types of collisions occur mainly due to human error. The error may be committed by the driver operating the train or by the individuals responsible for providing a clear path for the train. For example, to provide a clear path for the train the links connecting the train play a crucial role. If any wrong link is connected to the track at a certain point of time, it may lead to a collision.

BRIEF SUMMARY OF THE INVENTION

It is an object of the invention to prevent collision of trains.

The above object is achieved by a method for avoiding collision between trains, a computer readable media, an apparatus and an system.

The determining if the last track to be traversed by any of the other trains within the range and any of the tracks to be traversed in the list of the train receiving the last track to be traversed and the respective unique identification of each of the other trains are same, enable in ascertaining by a train whether the path of any other train within the range may intersect with its path.

According to an embodiment, the generation of the list of tracks includes receiving information of links and to the tracks the links connect in both the directions at each of the trains and a list including links to be traversed by said respective said train and the direction of motion of said respective said train at each of said respective said trains. This enables the trains to form a list of tracks to be traversed by the respective trains.

According to another embodiment, the information of links and to the tracks the links connect and the list including links to be traversed by said respective said train and the direction of motion of said respective said train is transmitted by an apparatus located at a station. This enables in providing the information of each of the trains within a zone of the station.

According to yet another embodiment, the method further comprises providing a list of all tracks and the links connecting to the tracks in both the directions to each of the trains determining if the links to be traversed by said respective said train are adjacent links in the said list of all tracks and the links connecting to the tracks in both the directions, and providing an indication of a danger in order to enable action to be taken to prevent the collision if the links to be traversed by said respective train are not adjacent links in said list of all tracks and the links connecting to the tracks in both the directions. The determining if the links to be traversed by the respective train are adjacent links enable in ensuring that the train may move to the designated tracks without the possibility of any collision.

According to yet another embodiment, the list of all tracks and the links connecting to the tracks in both the directions is transmitted by an apparatus located at a station. This eliminates the requirement of generating the list of all tracks and the links connecting to the tracks in both the directions at each of the trains and, thus, minimizing complexity.

The present invention is further described hereinafter with reference to illustrated embodiments shown in the accompanying drawings, in which:

BRIEF DESCRIPTION OF THE SEVERAL VIEWS OF THE DRAWING

FIG. 2 illustrates an apparatus to be equipped in each of the trains for avoiding collision according to an embodiment herein, FIG. 9b illustrates an example of a state table of links for the example of FIG. 9a, FIG. 10 with reference to FIGS. 1 and 2, illustrates a track and two trains in motion on the track, and FIG. 11 depicts a representative hardware environment for practicing the embodiments herein.

DESCRIPTION OF THE INVENTION

Figure 1:
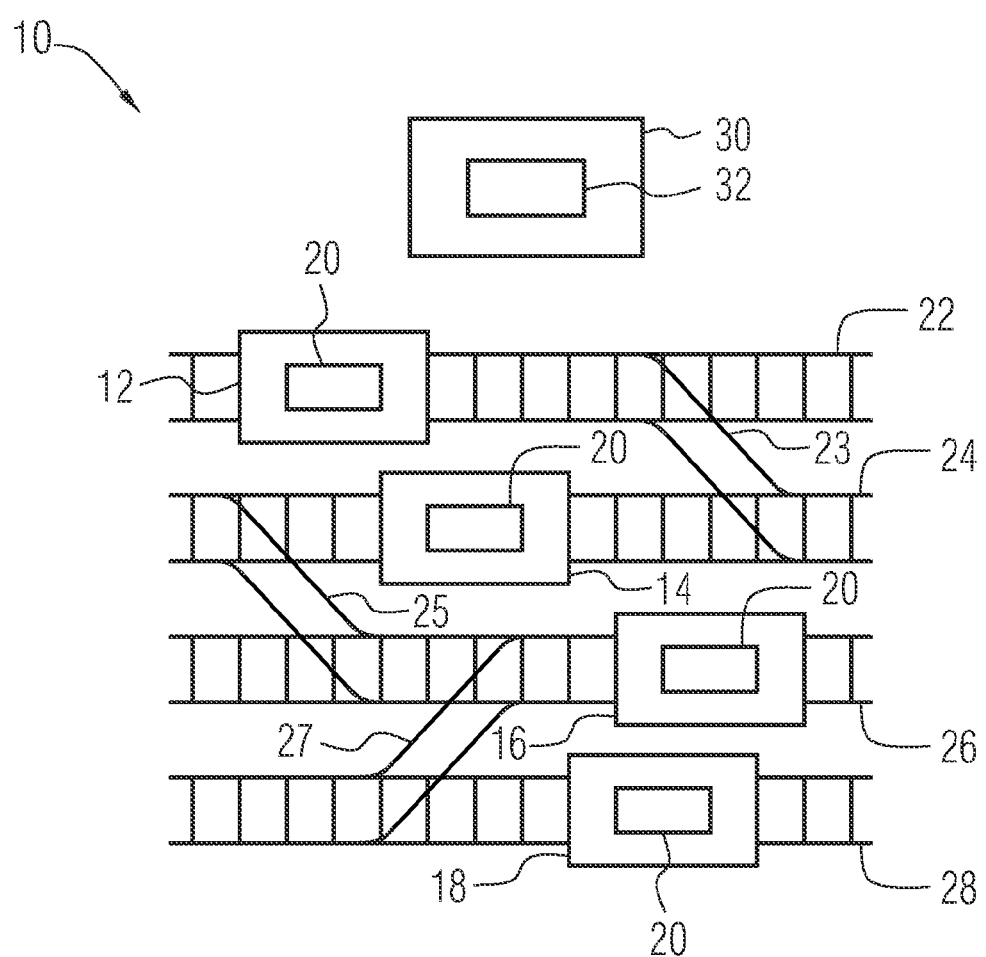
FIG. 1 illustrates a system for avoiding collision between trains according to an embodiment herein, FIG. 1b in reference to FIG. 1 illustrates communication between two trains moving on their respective tracks and the station according to an embodiment herein.

Various embodiments are described with reference to the drawings, wherein like reference numerals are used to refer to like elements throughout. In the following description, for purpose of explanation, numerous specific details are set forth in order to provide a thorough understanding of one or more embodiments. It may be evident that such embodiments may be practiced without these specific details.

FIG. 1 illustrates a system for avoiding collision between trains according to an embodiment herein. In the shown system 10, trains 12, 14, 16, 18 are equipped with an apparatus 20 each. The apparatus 20 typically comprises a transceiver and a processor such that the trains may communicate with each other a wireless network (not shown). Each of the trains 12, 14, 16, 18 is in motion on their respective tracks 22, 24, 26, 28 are within a range. Preferably, the range is determined such that it is greater than the distance required by the trains 12, 14, 16, 18 to apply brakes and come to rest without colliding on detection of a danger. Moreover, the range may be optimized such that undue load on the network is avoided so that the information transmitted by the trains 12, 14, 16, 18 may not be received by trains of another route. The tracks 22, 24, 26, 28 are interconnected by links 23, 25, 27. The trains 12, 14, 16, 18 are also within a zone from a station 30. Typically, the zone denotes an area of the station up till which links controlled from the station may be provided on the tracks. An apparatus 32 is located at a station 30 to enable transmission of information over the wireless network (not shown) from the station 30 to the trains 12, 14, 16, 18. The apparatus 32 may also receive information transmitted by the trains 12, 14, 16, 18.

FIG. 1b in reference to FIG. 1 illustrates communication between two trains 12, 14 moving on their respective tracks 22, 24 and the station 30 according to an embodiment herein. The apparatus 20 of the trains 12, 14 communicate with each other across a wireless network 29. The apparatus 20 of the trains 12, 14 also communicate with the apparatus 32 located at the station 30 across the wireless network 29.

Each of the trains 12, 14, 16, 18 periodically broadcasts a signal comprising a unique identification of the respective train and a unique identification of the track the respective train is moving on using the transceiver of the respective apparatus 20 equipped therein. Typically, each signal broadcasted or transmitted by the trains 12, 14, 16, 18 comprises the unique identification of the respective train to enable the recipient to identify the train transmitting the signal. The broadcasted signal by the trains 12, 14, 16, 18 is received by the transceiver of the apparatus 20 of each of the other trains 12, 14, 16, 18. For example, the unique identification of the train "12" and the unique identification of the track "22" the train 12 is moving on broadcasted by the train is received by the trains 14, 16, 18. The signal broadcasted by the trains 12, 14, 16, 18 may also comprise a direction of motion of the respective trains. Typically, with respect to a track, a train can have motion in either of the two directions of the track.

The unique identification of the train may be may be encoded into the processor of the respective apparatus 20. Additionally, the apparatus 20 may comprise input means so that the unique identification of the train may be provided as input to the processor. The unique identification may be stored in the processor or may be written to a memory. The apparatus may comprise an output means to provide information as output to a user.

The apparatus 20 may also comprise a reading means to read the unique identification of the track the train is moving on. The unique identification of the track read by the reading device is provided to the processor.

FIG. 2 illustrates the apparatus 20 to be equipped in each of the trains 12, 14, 16, 18 for avoiding collision according to an embodiment herein. The apparatus 20 comprises a transceiver 34, a processor 36, input means 38, output means 40 and reading means 42. The transceiver 34 is capable of transmitting and receiving information. The processor 36 is coupled to the transceiver 34 to provide the transceiver 34 with information for transmitting and also receive the information received by the transceiver 34. The processor 36 is coupled to the input means 38 so that information may be provided to the processor 36 as input. The input means 38 may include, but not for limitation, a keypad, a touch screen, or other means suitable for providing information to the processor 36 as input.

The processor 36 is also coupled to the output means 40 to provide information as output. The output means 40 may include, but not for limitation, a display, a touch screen, a speaker, a light source, or any other means suitable for outputting information or for providing indication. The reading means 42 may read the unique identification of the respective track the train is moving on and provide the unique identification of the respective track the train is moving on to the processor 36 of each of the trains 12, 14, 16, 18 of FIG. 1.

The reading means 42 may include, but not for limitation a radio frequency identification (RFID) reader, a bar code reader, or an imaging device. For example, the unique identification of the track may be encoded or hardwired into a RFID tag and arranged on the track. The reading means 30, i.e., the RFID reader may be positioned onto the train such that the RFID reader may receive the unique identification of the track transmitted by the RFID tag when the RFID reader comes within the range of the RFID tag. Similarly, the bar code reader may be positioned onto the train such that the bar code reader can read a bar code indicating the unique identification of the train. The bar code may be provided on the tracks. The imaging device may acquire an image of the unique identification of the track provided on the track. From the image acquired, the unique identification of the track may be extracted.

Referring again to FIG. 1, each of the trains 12, 14, 16, 18 approaching the station 30 are provided with information of the links 23, 25, 27 and to the tracks 22, 24, 26, 28 the links 23, 25, 27 connect in both the directions and a list including the links 23, 25, 27 to be traversed by the respective train and the direction of motion of the respective train. The links 23, 25, 27 may be identified by assigning a unique identification to each of the links 23, 25, 27. For example, the apparatus 32 located at the station 30 may broadcast the information of links 23, 25, 27 and the list including the links 23, 25, 27 to be traversed by the respective train and the direction of motion of the respective train. The trains 12, 14, 16, 18 may receive the information and the list as the trains 12, 14, 16, 18 are within the zone of the station 30 in the present embodiment. The apparatus 32 typically, comprises a transmitter and a processor such that information may be transmitted by the apparatus 32. The apparatus may also comprise an input means to receive input and an output means to provide output.

In an embodiment, a state table of links 23, 25, 27 for each of the trains 12, 14, 16, 18 containing the state of the links 23, 25, 27 with respect to motion of each of the trains 12, 14, 16, 18 may be generated by the processor 46 of the apparatus 32. From the generated state table it is determined if there is any conflict in state of any of the links 23, 25, 27. If a conflict is detected, then an indication may be provided to a user at the station 30. The user may alert the drivers of the respective trains which shall encounter the links 23, 25, 27 having conflicting states. Additionally, an individual managing the links also may be altered to prevent the collision.

Alternatively, the details of the conflict may be provided to the trains 12, 14, 16, 18 by transmitting the information regarding the conflict to either all the trains 12, 14, 16, 18 within the range or the trains 12, 14, 16, 18 which shall encounter the conflicting links.

It is well know that a link can either be connected, i.e., ON or disconnected, i.e., OFF. Therefore, the state of a link cannot be at the same moment ON and OFF. Thus, generating the state table of links and determining if there is any conflict of state of any of the links enable avoiding the collision of trains 12, 14, 16, 18. The states of the links are updated dynamically and depend on the path of a train.

Figure 3:
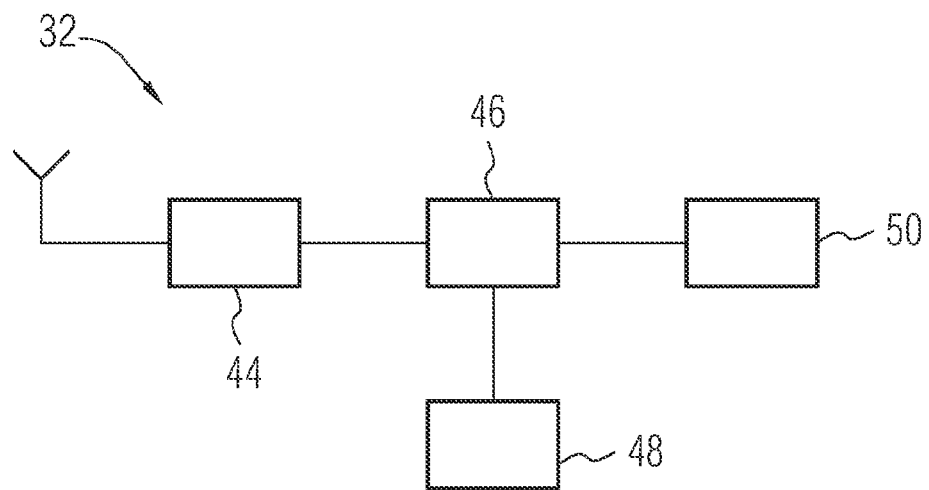
FIG. 3 illustrates an apparatus located at a station according to an embodiment herein, FIG. 4-6 with reference to FIG. 1 through 3 illustrate a method for avoiding collision between trains according to the embodiments herein, FIG. 7a with reference to FIGS. 1 through 3, illustrates seven tracks and four trains in motion on the tracks.

FIG. 3 illustrates the apparatus 32 located at a station. The apparatus 32 comprises a transmitter 44, a processor 46, input means 48 and output means 50. The transmitter 44 is capable of transmitting information. The processor 46 is coupled to the transmitter 44 to provide the transmitter 44 with information for transmitting. The processor 46 is coupled to the input means 48 so that information may be provided to the processor 46 as input. The input means 48 may include, but not for limitation, a keypad, a touch screen, or other means suitable for providing information to the processor 46 as input.

The processor 46 is also coupled to the output means 50 to provide information as output. The output means 50 may include, but not for limitation, a display, a touch screen, a speaker, a light source, or any other means suitable for outputting information or for providing indication. In an embodiment, the apparatus may also comprise a receiver (not shown) to information transmitted by trains 12, 14, 16, 18 of FIG. 1.

Referring now to FIGS. 1-2, the reading means 42 of the apparatus 20 equipped in each of the trains 12, 14, 16, 18 may read a unique identification of the link that would follow in the course of motion of the respective trains 12, 14, 16, 18 prior to a predetermined distance from the link. The predetermined distance is selected such that there is sufficient distance for the train to apply brakes and come to rest in case of any danger without any collision. The unique identification of the link may be read by the reading means 42 and provided to the processor 36. The unique identification of the link may be encoded or hardwired into a RFID tag and arranged on the track prior to the predetermined distance from the link. The reading means 42, i.e., the RFID reader may be positioned onto the train such that the RFID reader may receive the unique identification of the track transmitted by the RFID tag when the RFID reader comes within the range of the RFID tag. Similarly, a bar code reader may be positioned onto the train such that the bar code reader can read a bar code indicating the unique identification of the link prior to the predetermined distance from the link. The bar code indicating the unique identification of the link may be provided on the tracks prior to the predetermined distance from the link. In another implementation, the imaging device may acquire an image of the unique identification of the link prior to the predetermined distance from the link. From the image acquired, the unique identification of the link may be extracted.

From the unique identification of the link that would follow in the course of motion of the respective train, the processor 36 generates a list of tracks to be traversed by the respective train using the information of links 23, 25, 27 and to the tracks 22, 24, 26, 28 the links 23, 25, 27 connect in both the directions and the list including the links to be traversed by the respective train and the direction of the respective train. From the unique identification of the link the processor 36 is made aware of the respective link that would follow. Accordingly, from the list including the links to be traversed by the respective train, the processor is made aware of the links to be traversed by the respective train. By having the information of the links to be traversed, the processor 36 from the information of the links and to the tracks the links connect in both the directions generates the list of tracks to be traversed by the respective train.

From the list of tracks to be traversed by the respective train, the last track to be traversed is identified, and the unique identification of the last track to be traversed and the unique identification of the respective train are broadcasted by the transceiver 34 of the apparatus 20 of each of the trains 12, 14, 16, 18. The broadcasted unique identification of the last track to be traversed by the train and the unique identification of the train are received by each of the other trains 12, 14, 16, 18 within the range. For example, the unique identification of the last track to be traversed and the unique identification of the train broadcasted by the transceiver 34 of the train 12 are received by the transceiver 34 of the trains 14, 16, 18. In an implementation, the unique identification of the train may be appended with the unique identification of the last track to be traversed by the respective train and broadcasted thereafter.

From, the received last track to be traversed by each other train and the last track to be traversed by the train receiving the last track to be traversed by each other train, it is determined at the processor 36 of the apparatus 20 if the last track to be traversed by any of the other trains within the range and any of the tracks to be traversed by the train receiving the last track to be traversed by any of the other trains is same. If the last track to be traversed by any of the other trains and any of the tracks to be tracks to be traversed by the recipient train is same, the processor 36 provides an output to the output means 40 to provide an indication of a danger in order to enable action to be taken to prevent the collision.

Referring now to FIGS. 1-3, the processor 46 of the apparatus 32 located at the station 30 may generate a list of all the tracks 22, 24, 26, 28 and the links 23, 25, 27 connecting to the tracks 23, 25, 27 in both the directions. Thereafter, the processor 46 broadcasts the list so that the transceiver 34 of the apparatus 20 of each of the trains 12, 14, 16, 18 within the zone of the station 30 may receive the broadcasted list. The received list is then provided to the processor 36 and the processor 36 determines if the links to be traversed by the respective train are adjacent links in the list. If the links to be traversed by the respect train are not adjacent links, the processor provides the corresponding output to the output means 40 to provide an indication of a danger in order to enable action to be taken to prevent the collision.

Figure 4:
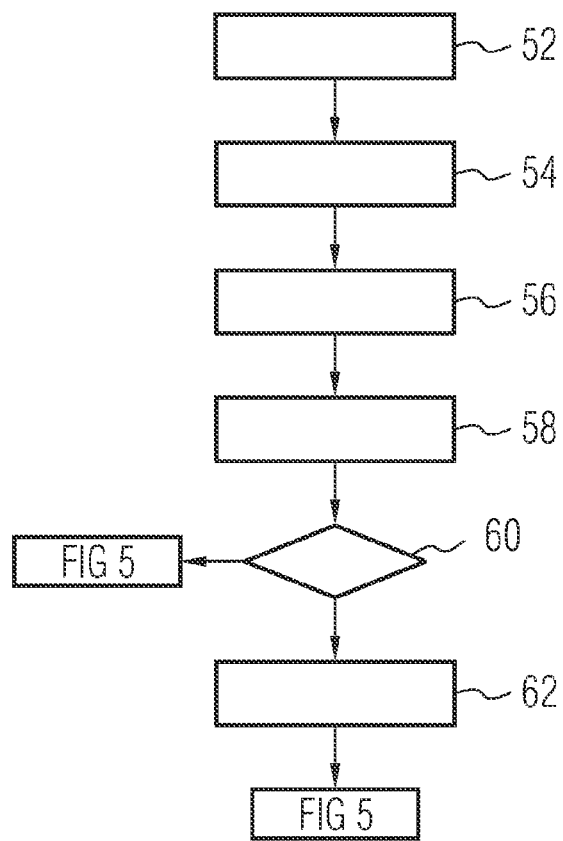

FIGS. 4, 5 and 6 with reference to FIG. 1 through 3 illustrate a method for avoiding collision between trains according to the embodiments herein. At block 52, each of the train 12, 14, 16, 18 is equipped with a transceiver 34. The transceiver 34 is adapted to transmit and receive information. Next, at block 54, a signal is periodically broadcasted from the transceiver 34 of each of the train 12, 14, 16, 18. The signal comprises a unique identification of a respective train and a unique identification of a track the respective train is moving on. In an embodiment, the signal may include a direction of motion of the respective train. Typically, with respect to a track, a train can have motion in either of the two directions of the track. Moving, next to block 56, the transceiver 34 of the apparatus 20 of each train 12, 14, 16, 18 receives the signal transmitted by each other train 12, 14, 16, 18 within a range. The received signal is provided to the processor 36, and at block 58, the signal is analyzed by the processor 36 to extract the unique identification of each other train and the unique identification of the track each other train is moving on. Moving next to block 60, it is determined if the track of the train receiving the signal and any of each other train within the range is same. If the track of the train receiving the signal and any of each other train within the range is same, then, at block 62, an indication of a danger is provided in order to enable action to be taken to prevent the collision. In FIG. 5, at block 64, information of links 23, 25, 27 and to the tracks 22, 24, 26, 28 the links 23, 25, 27 connect in both the directions is provided to each of the trains 12, 14, 16, 18. Next, at block 66, a list including links to be traversed by the respective train and the direction of motion of the respective train is provided to each of the respective trains 12, 14, 16, 18. Preferably, the information of links 23, 25, 27 and to the tracks the links connect and the list including links to be traversed by the respective train and the direction of motion of the respective train is transmitted by the apparatus 32 located at the station 30. Moving next to block 68, a state table of links 23, 25, 27 for each train 12, 14, 16, 18 is generated. The state table of links 23, 25, 27 contains the state of the links 23, 25, 27 with respect to motion of each train 23, 25, 27. Preferably, the state table of links 23, 25, 27 for each train is generated at the apparatus 32 located at the station 30. Alternatively, the state table of links 23, 25, 27 each train 12, 14, 16, 18 may be generated at the apparatus 20 each train 12, 14, 16, 18 is equipped with. For the apparatus 20 to generate the state table of links 23, 25, 27 the apparatus 20 is provided with the list including links 23, 25, 27 to be traversed by each train 12, 14, 16, 18 and the direction of motion of each of the trains 12, 14, 16, 18. At block 70, it is determined from the table if there is a conflict of state of any one of the links 23, 25, 27. If the conflict of state of any one of the links 23, 25, 27 is determined, then, at block 71 an indication of a danger is provided in order to enable action to be taken to prevent the collision.

IN FIG. 6, at block 72, information of the link that would follow in the course of motion of each of the trains 12, 14, 16, 18 is provided to each of the trains 12, 14, 16, 18 prior to a predetermined distance of the respective trains 12, 14, 16, 18 from the link. Next, at block 74, a list of tracks to be traversed by the respective train is generated using the information of links and to the tracks the links connect in both the directions and the list including links to be traversed by the respective train and the direction of motion of the respective train. Moving next to block 76, the last track to be traversed by the respective trains and the unique identification of the respective trains is broadcasted by the transceiver 34 of the respective trains. At block 78, the last track to be traversed and the respective unique identification of the respective train transmitted by each of the other trains is received by the transceiver 34 of each of the trains within the predetermined range. Next, at block 80, it is determined if the last track to be traversed by any of the other trains within the predetermined range and any of the tracks to be traversed by the train receiving the last track to be traversed by any of the other trains are same. If the last track to be traversed by any of the other trains within the predetermined range and any of the tracks to be traversed by the train receiving the last track to be traversed by any of the other trains are same, then, at block 82, an indication of a danger is provided in order to enable action to be taken to prevent the collision. If the last track to be traversed by any of the other trains within the predetermined range and any of the tracks to be traversed by the train receiving the last track to be traversed by any of the other trains are not same, then, at block 83, the train moves in the designated path.

Next, at block 84, a list of all tracks and the links connecting to the tracks in both the directions is provided to each of the trains. Preferably, the list of all tracks and the links connecting to the tracks in both the directions is transmitted by the apparatus 32 located at the station 30. At block 86, it is determined if the links to be traversed by the respective train are adjacent links in the list of all tracks and the links connecting to the tracks in both the directions. Moving next to block 88, an indication of a danger is provided in order to enable action to be taken to prevent the collision if the links to be traversed by the respective train are not adjacent links in the list of all tracks and the links connecting to the tracks in both the directions. If the links to be traversed by the respective train are adjacent links in the list of all tracks and the links connecting to the tracks in both the directions, then, at block 87, the train moves in the designated path.

Example 1

The following example illustrates how the above-described embodiments can be utilized to avoid collision between trains.

Figure 7A:
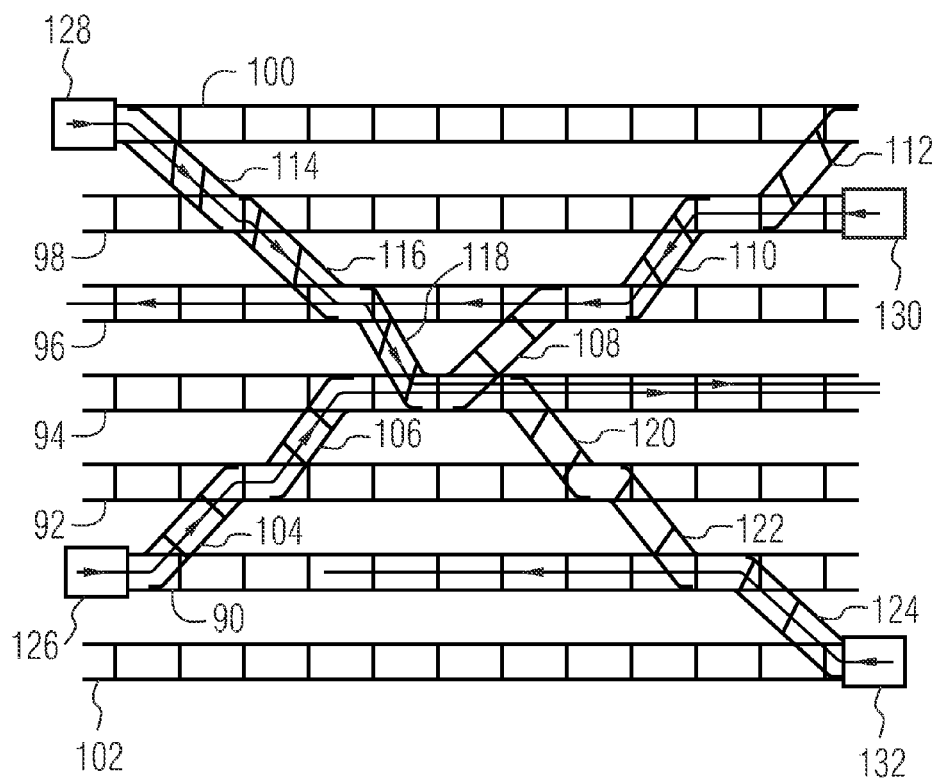
FIG. 7b illustrates a table containing the information of links and to the tracks the links connect for the example illustrated in FIG. 7a, FIG. 7c illustrates a table containing the list including the links to be traversed by each of the trains and the direction of motion of the trains for the example illustrated in FIG. 7a, FIG. 7d illustrates an example of a state table of links for the example of FIG. 7a, FIG. 8a with reference to FIGS. 1 through 3, illustrates five tracks and two trains in motion on the tracks.

FIG. 7a with reference to FIGS. 1 through 3, illustrates seven tracks and four trains in motion on the tracks. The tracks 90, 92, 94, 96, 98, 100, 102 are interconnected by links 104, 106, 108, 110, 112, 114, 116, 118, 120, 122, 124. The trains 126, 128, 130, 132 are in motion on the tracks. The trains 126, 128, 130, 132 are equipped with the apparatus 20. The trains 126, 128 are in motion in a left to right direction. The trains 130, 132 are in motion in a right to left direction. The direction of motion of the trains 126, 128, 130, 132 are also shown using arrows. The direction of motion from left to right is herein after referred as "$D_0$" and the direction of motion from right to left is herein after referred to as "$D_1$". Each of the trains 126, 128, 130, 132 shall broadcast a signal comprising a unique identification of the respective train and a unique identification of a track the respective train is moving on. For example, the train 126 shall broadcast periodically the signal comprising its unique identification "126" and the unique identification of the track "90" the train 126 is moving on. Also, in an implementation, the signal transmitted by the train 126 may also include the direction of the train 126 "$D_0$".

The transceiver 34 of each of trains 126, 128, 130, 132 within a range receives the signal broadcasted by each other train. For example, the transceiver 34 of the train 126 receives the signals broadcasted by the trains 128, 130, 132. The received signal is analyzed at the processor 36 of the apparatus 20 of each of the trains 126, 128, 130, 132 to extract the unique identification of each other train and the unique identification of the track each other train is moving on. From the extracted information it is determined at the processor 36 of each of the trains 126, 128, 130, 132 if the track of the train receiving the signal and any of each other train within the range is same. For example, at the processor 36 of the train 126 it is determined if the track of the trains 128, 130, 132 and the train of the train 126 is same. If the track of the train receiving the signal and any of each other train within the range is same an indication of a danger is provided in order to enable action to be taken to prevent the collision. If the track of the train receiving the information and each of the other train is not same, then there is no danger ahead and the train may proceed in the designated path. In the shown example of FIG. 7a, at the initial stage, as no two trains are on the same track, the trains proceed in the designated path.

The apparatus 32 located at the station 30 provides information of links and to the tracks the links connect in both the directions and a list including links to be traversed by the respective train and the direction of motion of the respective train to each of the respective trains 126, 128, 130, 136. For example, the apparatus 32 located at the station 30 may broadcast the information of links and the list including the links to be traversed by the respective train and the direction of motion of the respective train. The trains 126, 128, 130, 132 may receive the information and the list as the trains 126, 128, 130, 132 are within the range from the station 30 in the present example.

FIG. 7b illustrates a table containing the information of links and to the tracks the links connect for the example illustrated in FIG. 7a. The tracks to which each the links connect are provided for both the directions, i.e., $D_o$ and D.

FIG. 7c illustrates a table containing the list including the links to be traversed by each of the trains and the direction of motion of the trains for the example illustrated in FIG. 7a. In the shown example of FIG. 7c, the list includes the links to be traversed by each of the trains. However, in an implementation, only the links to be traversed by a respective train and the direction of the respective train may be provided to each of the respective trains.

The apparatus 32 also generates a state table of links containing the state of the links with respect to motion of each train. FIG. 7d illustrates an example of a state table of links for the example of FIG. 7a. From the generated state table it is determined if there is any conflict in state of any links. In the state table of links illustrated in FIG. 7d, it is seen that there is conflict with respect to the links 104, 116, 118 as the links 104, 116, 118 are required to be in a ON state and in a OFF state at the same moment. As the conflict is detected for the links 104, 116, 118 the apparatus 32 may alert the drivers of the trains 126, 128 as the trains 126, 128 shall encounter at least one of the links 104, 116, 118. Alternatively, the state table of links may be generated at the apparatus 20 each train 126, 128, 130, 132 is equipped.

Referring again to FIGS. 1 through 3 FIGS. 7a through 7d, each of the trains 126, 128, 130, 132 reads a unique identification of the link that would follow in the course of motion of the respective trains 126, 128, 130, 132 prior to a predetermined distance from the link. Preferably, the predetermined distance may be 3 KM. The unique identification of the link may be read by the reading means 42 and provided to the processor 36 of the apparatus 20. The train 126 reads the unique identification of the link 104 prior to the predetermined distance. Similarly, the trains 128, 130, 132 read the unique identification of the respective link 114, 110, 124. The unique identification of the links 104, 114, 110, 124 for the respective trains 126, 128, 130, 132 are the first links to be traversed by each of the trains 126, 128, 130, 132.

From the unique identification of the link that would follow in the course of motion of the respective train, the processor 36 of each of the trains 126, 128, 130, 132 generates a list of tracks to be traversed by the respective train using the information of links and to the tracks the links connect in both the directions as illustrated in FIG. 7b and the list including the links to be traversed by the respective train and the direction of the respective train as illustrated in FIG. 7c.

From the unique identification of the link the processor 36 is made aware of the respective link that would follow. Accordingly, from the list including the links to be traversed by the respective train, the processor is made aware of the links to be traversed by the respective train. By having the information of the links to be traversed, the processor 36 from the information of links and to the tracks the links connect in both the directions generates the list of tracks to be traversed by the respective train. The list of tracks to be traversed by the trains 126, 128, 130, 132 are:

Train 126—{90, 92, 94}
Train 128—{100, 98, 96, 94}
Train 130—{98, 96}
Train 132—{102, 90}

From the list of tracks to be traversed by the respective trains 126, 128, 130, 132 the last track to be traversed is identified, and the unique identification of the last track to be traversed and the unique identification of the respective train are broadcasted by the transceiver 34 of the apparatus 20 of each of the trains 126, 128, 130, 132. The train 126 broadcasts the unique identification of the last track "96" and its unique identification "126". Similarly, the trains 128, 130, 132 broadcast the unique identification of the last track "94", "96", "90" to be traversed by them and their respective unique identification "128", "130", "132".

The broadcasted unique identification of the last track to be traversed by the respective train and the unique identification of the respective train are received by each other train within the range. For example, the unique identification of the last track 94 to be traversed and the unique identification of the train 126 broadcasted by the transceiver 34 of the train 126 are received by the transceiver 34 of the trains 128, 130, 130.

The processor 36 of each of the trains then determines if the last track to be traversed by any of the each other train and any of the tracks to be traversed by the respective train is same. The last track to be traversed by the train 126 is the track 94 which is present in the list of tracks to be traversed by the train 128. Similarly, the last track 94 to be traversed by the train 128 is present in the list of tracks to be traversed by the train 126. Therefore, the processor 36 at the trains 126, 128 provides the corresponding output to the output means 40 to provide an indication of a danger to enable the collision to be avoided.

Example 2

The following example illustrates how the above-described embodiments may not provide false indication of a danger if there is no danger of a collision.

Figures 8A, 8B:
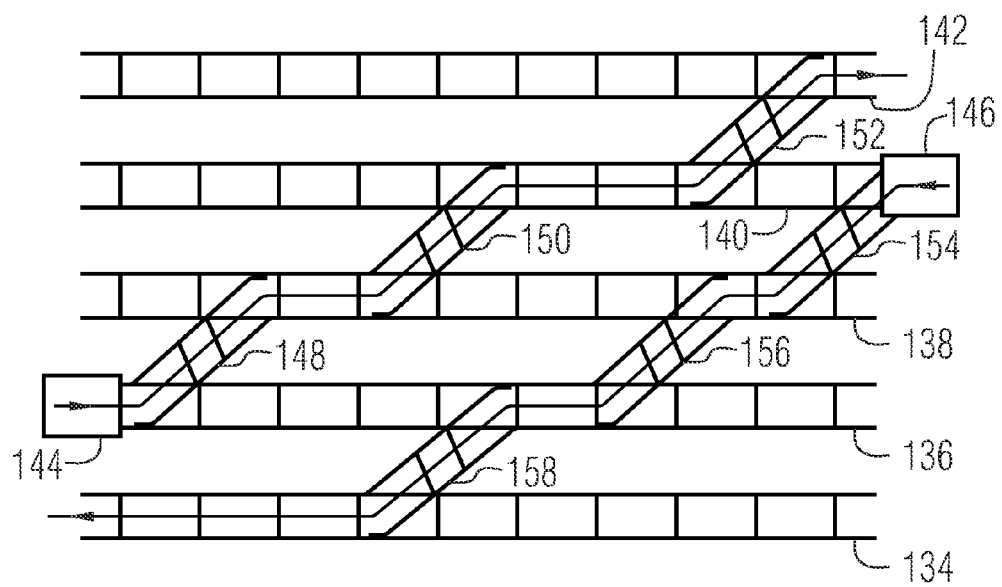
FIG. 8b illustrates a table containing the information of links and to the tracks the links connect for the example illustrated in FIG. 8a, FIG. 8c illustrates a table containing the list including the links to be traversed by each of the trains and the direction of motion of the trains for the example illustrated in FIG. 8a, FIG. 8d illustrates an example of a state table of links for the example of FIG. 8a, FIG. 8e illustrates a table containing a list of all the tracks and the links connecting to the tracks in both the directions to each of the trains for the example of FIG. 8a, FIG. 9a with reference to FIGS. 1 through 3, illustrates five tracks and two trains in motion on the tracks.

FIG. 8a with reference to FIGS. 1 through 3, illustrates five tracks and two trains in motion on the tracks. The tracks 134, 136, 138, 140, 142 are interconnected by links 148, 150, 152, 154, 156, 158. The trains 144, 146 are in motion on the tracks. The trains 144, 146 are equipped with the apparatus 20. The train 144 is in motion in a left to right direction. The train 146 is in motion in a right to left direction. The direction of motion of the trains 144, 146 are also shown using arrows. The direction of motion from left to right is herein after referred as "$D_0$" and the direction of motion from right to left is herein after referred to as "$D_1$".

FIG. 8b illustrates a table containing the information of links and to the tracks the links connect for the example illustrated in FIG. 8a. The tracks to which each the links connect are provided for both the directions, i.e., $D_0$ and $D_1$.

FIG. 8c illustrates a table containing the list including the links to be traversed by each of the trains and the direction of motion of the trains for the example illustrated in FIG. 8a. In the shown example of FIG. 8c, the list includes the links to be traversed by each of the trains 144, 146. However, in an implementation, only the links to be traversed by a respective train and the direction of the respective train may be provided to each of the respective trains 144, 146.

FIG. 8d illustrates an example of a state table of links for the example of FIG. 8a. From the generated state table it is determined if there is any conflict in state of any links. In the state table of links illustrated in FIG. 8d, it is seen that there is no conflict with respect to the state of any of the links 148, 150, 152, 154, 156, 158.

Referring again to FIGS. 1 through 3 FIGS. 8a through 8d, the trains 144, 146 reads a unique identification of the link that would follow in the course of motion of the respective trains 144, 146 prior to a predetermined distance from the link. The train 144 reads the unique identification of the link 148 prior to the predetermined distance. Similarly, the train 146 reads the unique identification of the link 154. From the unique identification of the link that would follow in the course of motion of the respective trains 144, 146, the processor 36 of each of the trains 144, 146 generates a list of tracks to be traversed by the respective train using the information of links and to the tracks the links connect in both the directions as illustrated in FIG. 8b and the list including the links to be traversed by the respective train and the direction of the respective train as illustrated in FIG. 8c.

The list of tracks to be traversed by the trains 126, 128, 130, 132 are:

Train 144—{136, 138, 140, 142}
Train 146—{140, 138, 136, 134}

From the list of tracks to be traversed by the respective trains 144, 146 the last track to be traversed is identified, and the unique identification of the last track to be traversed and the unique identification of the respective train are broadcasted by the transceiver 34 of the apparatus 20 of each of the trains 144, 146. The train 144 broadcasts the unique identification of the last track "142" and its unique identification "144". Similarly, the train 146 broadcasts the unique identification of the last track "134" to be traversed the respective unique identification "146".

The broadcasted unique identification of the last track 142 to be traversed by the train 144 and the unique identification of the train 144 is received by the train 146. Similarly, the broadcasted unique identification of the last track 134 to be traversed by the train 146 and the unique identification of the train 146 is received by the train 144.

The processor 36 of each of the trains 144, 146 then determines if the last track to be traversed by any of the each other train and any of the tracks to be traversed by the respective train is same. In the present example, it is seen that the last track to be traversed by the train 144 is the track 142 and is not present in the list of tracks to be traversed by the train 146. Similarly, the last track 134 to be traversed by the train 146 is not present in the list of tracks to be traversed by the train 144. Therefore, the trains 144, 146 may proceed in the designated path without any indication being aroused.

FIG. 8e illustrates a table containing a list of all the tracks and the links connecting to the tracks in both the directions to each of the trains for the example of FIG. 8a. The list of all the tracks 134, 136, 138, 140, 142 and the links 148, 150, 152, 154, 156, 158 connecting to the tracks 134, 136, 138, 140, 142 are used for confirmation and checking the possibility of the collision at crucial instances. The table is typically formed with each track as row and each link meeting the track from left to right for the direction $D_0$ and from right to left for the direction $D_1$. For example, the train 144 is on track 136 and shall move to track 138 by traversing the link 148. From the track 138 the train 144 shall move to the track 140 by traversing the link 150. Thereafter, the train 144 moves to the track 142 by traversing the link 152. The links to be traversed by the train 144 are encircled. Similarly, the train 146 moves from the track 140 to the track 134 by traversing the links 154, 156, 158. The links to be traversed by the train 146 are marked by rectangles. From the illustrated table of FIG. 8e, it is seen that the links traversed by the train 144 and 146 are adjacent links and therefore, non-intersecting. Therefore, there is no danger of collision and the trains 144, 146 move along the designated path.

However, in case the links for a train in each track is not adjacent, then, there is a danger of collision. Accordingly, an indication is provided in order to enable action to be taken to prevent the collision.

Example 3

The following example illustrates how the above-described state table of links may be used to avoid collision between trains.

FIG. 9a with reference to FIGS. 1 through 3, illustrates five tracks and two trains in motion on the tracks. The tracks 160, 162, 164, 166, 168 are interconnected by links 174, 176, 178, 180, 182, 184. The trains 170, 172 are in motion on the tracks. The trains 170, 172 are equipped with the apparatus 20. The train 170 is in motion in a left to right direction. The train 172 is in motion in a right to left direction. The direction of motion of the trains 170, 172 are also shown using arrows. The direction of motion from left to right is herein after referred as "$D_0$" and the direction of motion from right to left is herein after referred to as "$D_1$".

FIG. 9b illustrates an example of a state table of links for the example of FIG. 9a. From the generated state table it is determined if there is any conflict in state of any links. In the state table of links illustrated in FIG. 9b, it is seen that there is a conflict of state for the links 174, 184. Accordingly, the trains 170 and 172 are provided an indication of a danger in order to avoid the collision.

Example 4

The following example illustrates how the above-described embodiment of broadcasting a unique identification a train and a unique identification of a track the respective train is moving on may be used to avoid collision between trains.

FIG. 10 with reference to FIGS. 1 and 2, illustrates a track and two trains in motion on the track. On the track 190, the trains 192, 194 are in motion in a direction opposite to each other. The trains 192, 194 are equipped with the apparatus 20. The train 192 is in motion in a left to right direction. The train 194 is in motion in a right to left direction. The direction of motion of the trains 192, 194 are also shown using arrows. The direction of motion from left to right is herein after referred as "$D_0$" and the direction of motion from right to left is herein after referred to as "$D_1$".

Each of the trains 192, 194 shall broadcast a signal comprising a unique identification of the respective train and a unique identification of a track the respective train is moving on. For example, the train 192 shall broadcast periodically the signal comprising its unique identification "192" and the unique identification of the track "190" the train 192 is moving on. Similarly, the train 194 shall broadcast periodically the signal comprising its unique identification "194" and the unique identification of the track "190" the train 194 is moving on. Also, in an implementation, the signal transmitted by the train 192 may also include the direction of the train 192 "$D_0$".

The transceiver 34 of each of trains 192, 194 within a range receives the signal broadcasted by each other train. For example, the transceiver 34 of the train 192 receives the signal broadcasted by the train 194. The transceiver of the train 194 receives the signal broadcasted by the train 192. The received signal is analyzed at the processor 36 of the apparatus 20 of each of the trains 192, 194 to extract the unique identification of each other train and the unique identification of the track each other train is moving on. From the extracted information it is determined at the processor 36 of each of the trains 192, 194 if the track of the train receiving the signal and any of each other train within the range is same. For example, at the processor 36 of the train 192 it is determined if the track of the train 194 and the train 192 is same. As the track of the train 192 and the train 194 is same, an indication id provided to the driver in order to enable him to prevent the collision. Similarly, an indication may be provided to the driver of the train 194 as the track of the train 194 and the train 192 is same.

FIG. 11 depicts a representative hardware environment for practicing the embodiments herein. This schematic drawing illustrates a hardware configuration of an information handling/computer system 200 in accordance with the embodiments herein. The system comprises at least one processor or central processing unit (CPU) 202. The CPU 202 is interconnected via bus 204 to various devices such as a memory 206, input/output (I/O) controller 208, and user interface controller 210. Depending on the type and configuration of the system 200, the memory 206 may be volatile (such as random access memory (RAM) etc., non-volatile (read only memory (ROM), flash memory devices etc.) or a combination of the two. The memory 206 is used to store instructions and data for use by the CPU 202. The I/O controller 208 can connect to peripheral devices, such as CD drives 212 and hard drives 214, or other program storage devices that are readable by the system. Typically, an operating system for the computer system 200 as well as an application program is stored onto the hard drive 214. The operating system runs on the CPU 202 and is used to coordinate and provide control of various components within system 200. The system 200 can read the inventive instructions on the hard drive 214 and load them onto the memory 206 for execution by the CPU 202. The user interface controller 210 can connect to a keyboard 216, mouse 218, speaker 220, microphone 222, display device 224 and/or other user interface devices such as a touch screen device (not shown) to the bus 204 to gather user input and also to provide system output to the user.

The embodiments described herein enable avoiding collision between trains. Additionally, collisions may be avoided despite human error or lack of feedback mechanism. Moreover, the collision occurring due to the motion of two trains on the same track may be avoided. Additionally, the collision occurring due to the error in a state of a link may be avoided.

While this invention has been described in detail with reference to certain preferred embodiments, it should be appreciated that the present invention is not limited to those precise embodiments. Rather, in view of the present disclosure which describes the current best mode for practicing the invention, many modifications and variations would present themselves, to those of skill in the art without departing from the scope and spirit of this invention. The scope of the invention is, therefore, indicated by the following claims rather than by the foregoing description. All changes, modifications, and variations coming within the meaning and range of equivalency of the claims are to be considered within their scope.

The invention claimed is:

1. A method for avoiding collisions between trains, which comprises the steps of:
   providing information to a plurality of trains of a link that will follow in a course of motion of each of the plurality of trains prior to a predetermined distance of the plurality of trains from the link;
   generating a list of tracks to be traversed by a respective train using information relating to links and to the tracks the links connect in both directions and a list including the links to be traversed by the respective train and a direction of motion of the respective train;
   broadcasting by each of the trains a last track to be traversed by the respective train and an unique identification of the respective train;
   receiving at each of the trains the last track to be traversed and the respective unique identification of the respective train transmitted by each of the other trains within a given range;
   determining if the last track to be traversed by any of the other trains within the given range and any of the tracks to be traversed in a list of the train receiving the last track to be traversed and the respective unique identification of each of the other trains are the same; and
   providing an indication of danger to enable action to be taken to prevent a collision if the last track to be traversed by any of the other trains within the given range and any of the tracks to be traversed in the list of the train receiving the last track to be traversed and the respective unique identification of each of the other trains are the same.

2. The method according to claim 1, wherein the generating step for generating the list of tracks includes receiving the information relating to the links and to the tracks the links connect in both directions at each of the trains and the list including the links to be traversed by the respective train and the direction of motion of the respective train at each of the respective trains.

3. The method according to claim 2, wherein the information relating to the links and to the tracks the links connect and the list including the links to be traversed by the respective train and the direction of motion of the respective train is transmitted by an apparatus located at a station.

4. The method according to claim 1, which further comprises:
   providing a list of all the tracks and the links connecting to the tracks in both directions to each of the trains;
   determining if the links to be traversed by the respective train are adjacent links in the list of all the tracks and the links connecting to the tracks in both the directions; and
   providing an indication of danger to enable action to be taken to prevent the collision if the links to be traversed by the respective train are not adjacent links in the list of all the tracks and the links connecting to the tracks in both the directions.

5. The method according to claim 4, which further comprises transmitting the list of all the tracks and the links connecting to the tracks in both of the directions by an apparatus located at a station.

6. A computer-readable media containing a computer program that is executable by a processor to perform the method which comprises the steps of:
   providing information to a plurality of trains of a link that will follow in a course of motion of each of the plurality of trains prior to a predetermined distance of the plurality of trains from the link;
   generating a list of tracks to be traversed by a respective train using information relating to links and to the tracks the links connect in both directions and a list including the links to be traversed by the respective train and a direction of motion of the respective train;
   broadcasting by each of the trains a last track to be traversed by the respective train and an unique identification of the respective train;
   receiving at each of the trains the last track to be traversed and the respective unique identification of the respective train transmitted by each of the other trains within a given range;
   determining if the last track to be traversed by any of the other trains within the given range and any of the tracks to be traversed in the list of the train receiving the last track to be traversed and the respective unique identification of each of the other trains are the same; and
   providing an indication of danger to enable action to be taken to prevent a collision if the last track to be traversed by any of the other trains within the given range and any of the tracks to be traversed in the list of the train receiving the last track to be traversed and the respective unique identification of each of the other trains are the same.

7. An apparatus for avoiding collisions between trains, the apparatus comprising:
reading means for reading an indication of a link that would follow in a course of motion of a respective train prior to a predetermined distance of the respective train from the link;
a processor adapted to generate a list of tracks to be traversed by the respective train using information relating to the links and to tracks the links connect in both directions and a list including the links to be traversed by the respective train and a direction of motion of the respective train, said processor connected to said reading means;
a transceiver connected to said processor and adapted to:
broadcast a last track to be traversed by the respective train and an unique identification of the respective train; and
receive the last track to be traversed and the unique identification of the respective train transmitted by each of other trains within a given range;
said processor determining if the last track to be traversed by any of the other trains within the given range and any of the tracks to be traversed in the list of the respective train receiving the last track to be traversed and the unique identification of each of the other trains are the same; and
an output means providing an indication of a danger in order to enable action to be taken to prevent a collision if the last track to be traversed by any of the other trains within the given range and any of the tracks to be traversed in the list of the respective train receiving the last track to be traversed and the unique identification of each of the other trains are the same, said output means connected to said processor.

8. The apparatus according to claim 7, wherein said transceiver is configured to receive the information relating to the links and to the tracks the links connect in both directions from an apparatus located at a station.

9. The apparatus according to claim 7, wherein said transceiver is configured to receive the links to be traversed by the respective train and the direction of motion of the respective train from an apparatus located at a station.

10. The apparatus according to claim 7, wherein:
said transceiver configured to receive a list of all the tracks and the links connecting to the tracks in both directions;
said processor configured to determine if the links to be traversed by the respective train are adjacent links in the list of all the tracks and the links connecting to the tracks in both directions; and
said output means adapted to provide an indication of the danger to enable action to be taken to prevent the collision if the links to be traversed by the respective train are not adjacent links in the list of all the tracks and the links connecting to the tracks in both directions.

11. A system, comprising:
at least two apparatuses disposed one each in at least two trains, each of said apparatuses containing:
reading means for reading an indication of a link that would follow in a course of motion of a respective train prior to a predetermined distance of the respective train from the link;
a processor adapted to generate a list of tracks to be traversed by the respective train using information relating to the links and to tracks the links connect in both directions and a list including the links to be traversed by the respective train and a direction of motion of the respective train, said processor connected to said reading means;
a transceiver connected to said processor and adapted to:
broadcast a last track to be traversed by the respective train and an unique identification of the respective train; and
receive the last track to be traversed and the unique identification of the respective train transmitted by each of other trains within a given range;
said processor determining if the last track to be traversed by any of the other trains within the given range and any of the tracks to be traversed in the list of the respective train receiving the last track to be traversed and the unique identification of each of the other trains are the same; and
an output means providing an indication of a danger in order to enable action to be taken to prevent a collision if the last track to be traversed by any of the other trains within the given range and any of the tracks to be traversed in the list of the respective train receiving the last track to be traversed and the unique identification of each of the other trains are the same, said output means connected to said processor.

* * * * *